United States Patent

[11] 3,600,580

[72] Inventor  Uriel Vogel
               Patchogue, N.Y.
[21] Appl. No. 859,783
[22] Filed     Sept. 22, 1969
[45] Patented  Aug. 17, 1971
[73] Assignee  The United States of America as
               represented by The United States Atomic
               Energy Commission

[54] CHARGED PARTICLE BEAM DENSITY MEASUREMENT DEVICE
     5 Claims, 8 Drawing Figs.
[52] U.S. Cl. ............................................. 250/71.5 R,
                                       250/49.5 R, 324/71 EB
[51] Int. Cl. ...................................................... G01j 39/18
[50] Field of Search ........................................... 219/121
                                  EB; 250/49.5 R; 324/71 EB

[56]                References Cited
              UNITED STATES PATENTS
3,207,982   9/1965   Rose ............................. 250/49.5 R
3,370,171   2/1968   Ohta ............................. 250/49.5 R Primary Examiner—James W. Lawrence
Assistant Examiner—A. L. Birch
Attorney—Roland A. Anderson ABSTRACT: Apparatus for measuring the location and intensity profile of a charged particle beam by moving a wire with high velocity, in a plane, transversely through the beam, whereby the wire spills a small portion of the beam for accurately generating signals from the spilled portion of the beam corresponding to the location and the density profile of the beam.

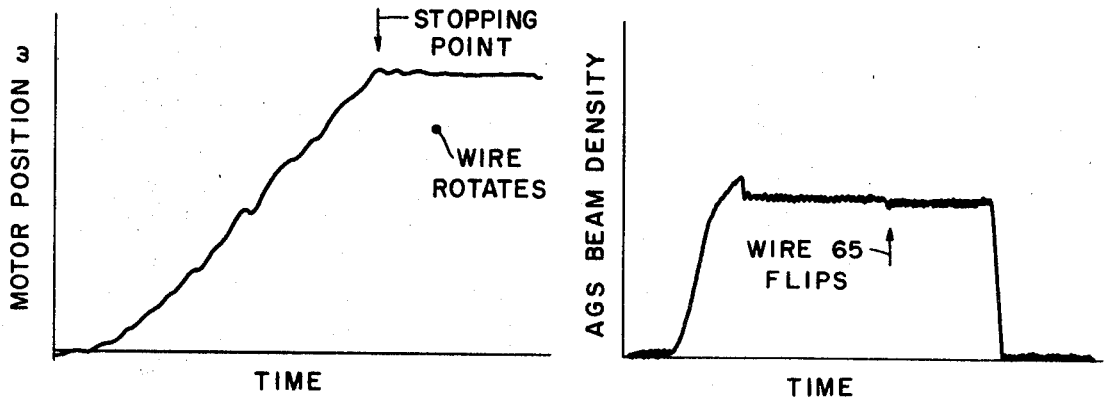
Fig. 5
Fig. 6
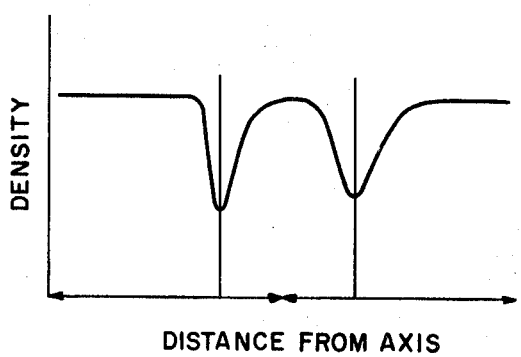
Fig. 7
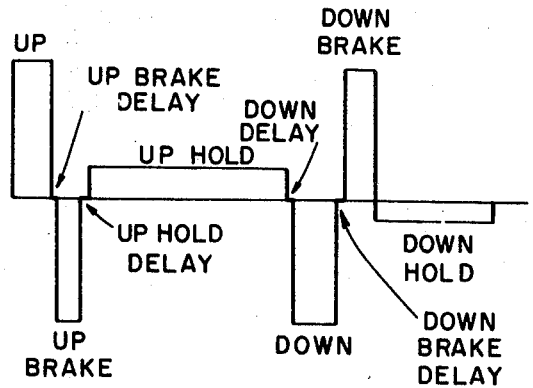
Fig. 2
INVENTOR.
URIEL VOGEL

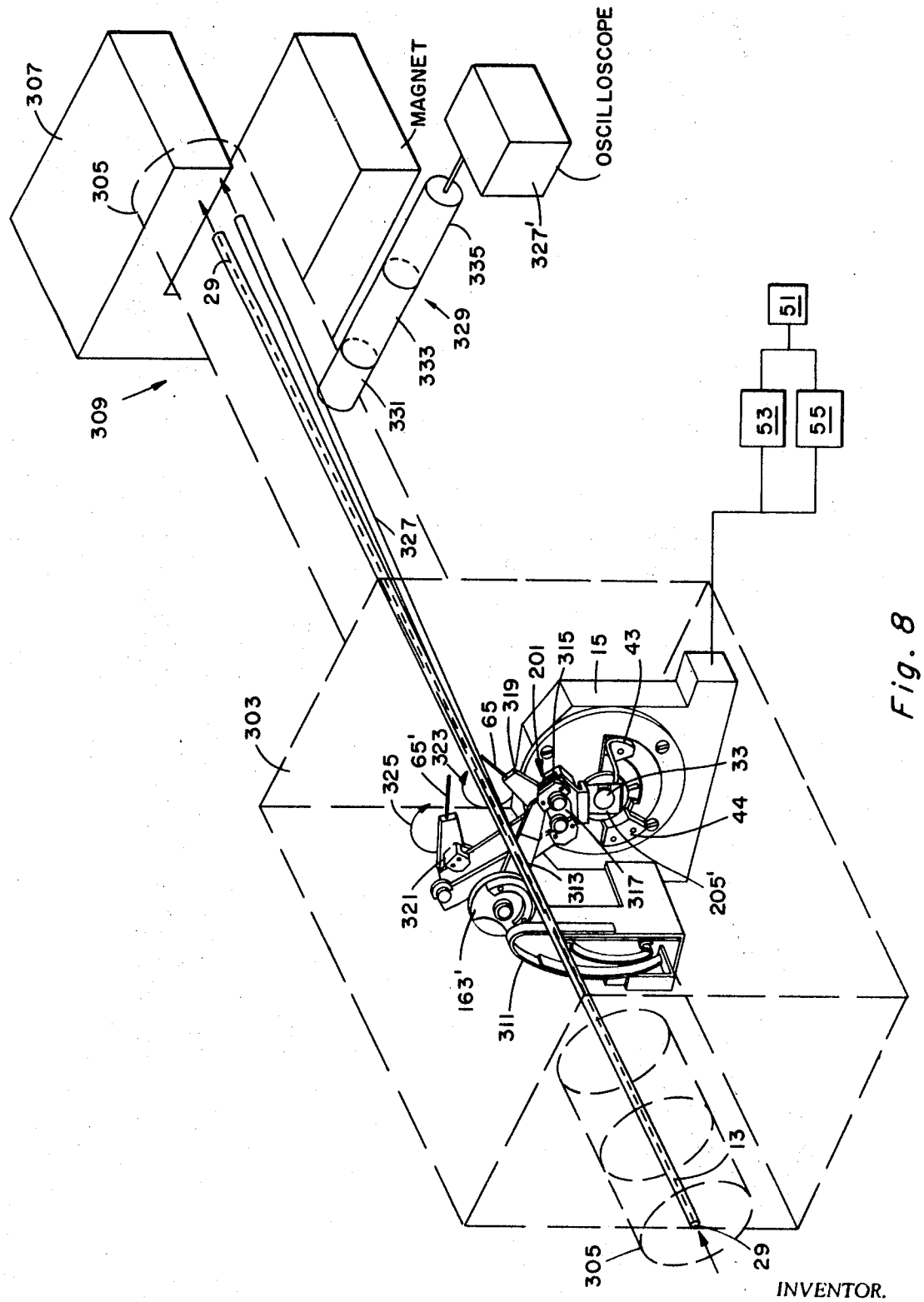

3,600,580

CHARGED PARTICLE BEAM DENSITY MEASUREMENT DEVICE

BACKGROUND OF THE INVENTION

Accelerators having high energy charged particle beams that circulate along an equilibrium axis, require means for locating the beam position and for measuring the beam density. One method used heretofore for determining the variation of the beam from the equilibrium beam axis, comprises positioning a solid, stationary target, such as a plate of metal or Mylar brand acrylic material whose center corresponds to the equilibrium axis, so that beam burns a hole in the target at or near the target center. Another system, proposed or successfully used heretofore for beam density measurements, comprises measuring the ionization of the residual gas in the evacuated tube for confining and transporting the charged particle beam. However, due to the conditions involved in accelerating these beams to high energies in a vacuum, these systems have involved burdensome, expensive, complex or time consuming techniques, or have made it difficult or expensive to provide the required measurements accurately, or immediately at widely located or closely spaced periods of time. It is additionally advantageous to provide a simple, effective and easy to maintain combined beam location and density profile measuring system for high energy charged particle beams, particularly high intensity proton beams, without producing undesirable beam loss, beam distortion, or undesirable beam perturbations.

SUMMARY OF THE INVENTION

This invention, which was made in the course of or under a contract with the United States Atomic Energy Commission, employs means for rapidly sweeping a thin beam spilling wire, or wires, transversely through a high energy, high intensity beam of charged particles for the downstream detection of the spilled beam. More particularly, this invention provides a substantially nondestructive system for rapidly spilling a small portion of a high energy, high density beam of protons by passing a thin beryllium wire transversely through the beam at wire velocities of between 6, to 10 meters/second or more, for the determination of the beam location and/or density profile by the detection of the spilled beam at a location spaced from the beam spilling wire movement. In one embodiment, the apparatus of this invention, comprises a motor having an eccentrically rotatable means coupled thereto for moving at least one thin wire in an eccentrically moveable train for producing the rapid wire velocity, and whereby a scintillation crystal, light-pipe and photomultiplier operate for the detection of the spilled beam at a location spaced from the beam spilling wire movement. With the proper selection of components, and the suitable operation thereof, as described in more detail hereinafter, the system of this invention provides a practical system for producing the required spill, and location and/or beam density profile measurements accurately, effectively and simply.

The above and further novel features and objects of this invention will appear more fully from the following detailed description when reading the same in connection with the accompanying drawings, which illustrate two embodiments of this invention; and the appended claims will point out the novel features thereof.

BRIEF DESCRIPTION OF THE DRAWINGS

FIG. 2 represents a standard energization sequence for the motor of FIG. 1;

FIG. 3 illustrates;

FIG. 5 represents a graphic illustration of an oscilloscope display of the angular position of the wire of FIG. 4 and a pulse produced thereby at the completion of the sweep thereof;

FIG. 6 represents a graphic illustration of an oscilloscope display of a beam circulating in the Brookhaven National Laboratory AGS with a 10 mil diameter wire flipping therethrough at 560 ms. AGS time with a velocity of 6.1 m/s.

FIG. 7 represents graphic illustrations of vertical and horizontal beam density profiles produced in accordance with this invention.

FIG. 8 represents a partial three-dimensional view of another embodiment of this invention.

DESCRIPTION OF THE PREFERRED EMBODIMENT

This invention has utility in measuring the location and density profiles of charged particle beams in the Brookhaven National Laboratory, Alternating Gradient Synchrotron, which, as described in "Particle Accelerators" by Livingston and Blewett, McGraw Hill, 1962, provides beam densities up to above $10^{11}$ charged particles per pulse, or more, charged particle energies of up to 33 Bev. or more, beam diameters from 1 inch or more down to 0.5 inch or less, and beam constituents, comprising e.g. protons and/or heavier charged particles. To this end, this invention is employed between focusing and bending magnets that must confine beams from low to high energies in a closed tube capable of holding a vacuum of from $10^{17}$ to $10^{18}$ mm. of mercury. Thus, this invention operates through suitable atmospheric air locks, in a wide variety of magnetic fields for confining and accelerating charged particle beams along an endless equilibrium axis. Additionally, this invention provides for remote operation with prolonged exposure in beam enclosures near beam paths that induce radioactivities of up to 100 R/hr. or more. However, as understood in more detail hereinafter, this invention has utility in measuring the beam location and density profile for controlling and operating a wide variety of accelerators for a wide variety of beams, for providing for the improved injecting, accelerating, storing, extracting and targeting of the beams for a wide variety of experimental accelerator applications in the fields of chemistry, electricity, metallurgy, mechanical engineering and physics, as understood in the art.

Figure 1:
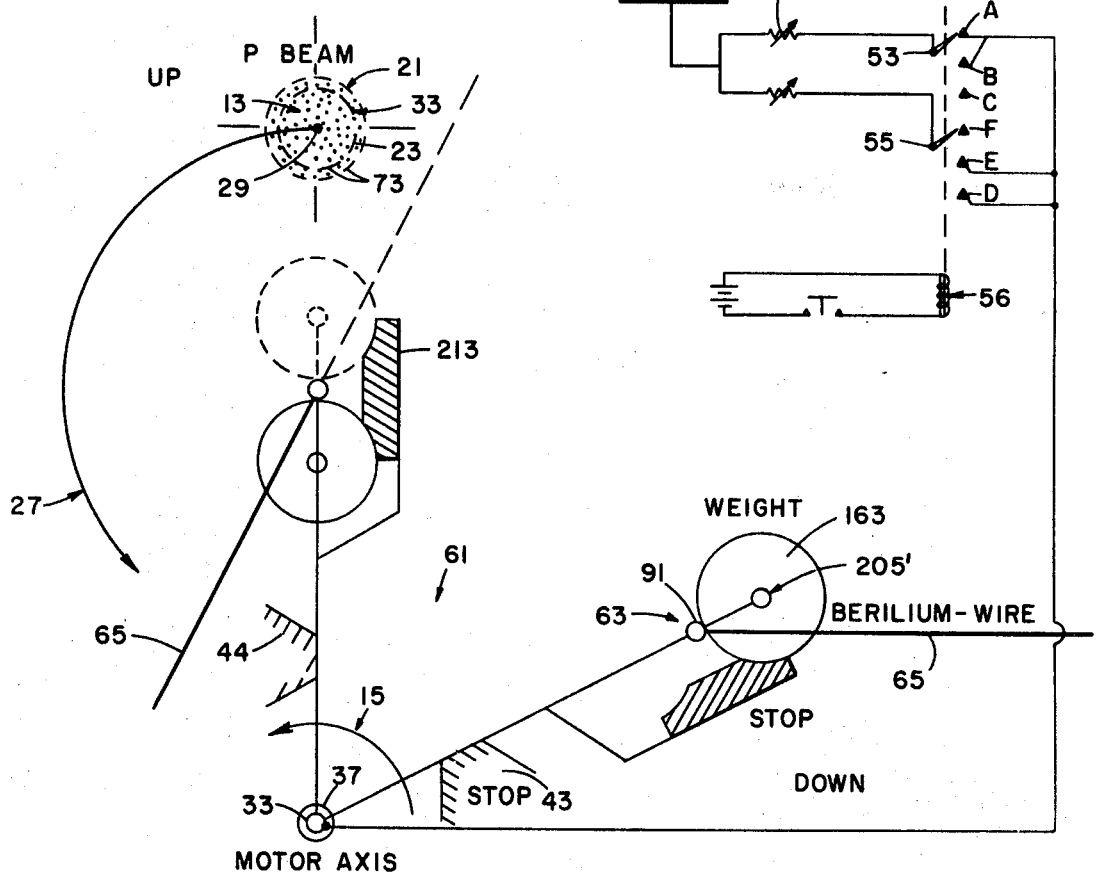
FIG. 1 represents a partial schematic cross section of one embodiment of the apparatus of this invention.

FIG. 1 illustrates one embodiment of this invention for measuring the location and beam density profile of a beam in a typical high energy accelerator of the type mentioned above, wherein the accelerator circulates a charged particle beam 13 in a vacuum enclosure, typically, in the form of a ring-shaped, evacuated beam tube of elliptical cross section with large major small minor axes. As well-known, various targeting motors 15 for rotating targets into the beam 13, must perform their functions in vacuum boxes having atmospheric airlocks for interior access to the beam at various locations around the circumference of the accelerator ring formed by the hollow, ring-shaped evacuated tube. Since the beam 13 follows a varying path, due e.g. to betatron wave oscillation, and the beam cross section varies in diameter between normal upper and lower limits, such as illustrated in FIG. 1 by cross sections 21 and 23, due to momentum compaction from low energy at injection to high energy after acceleration, these targeting motors 15 must stand positioned inside the vacuum box, but outside the beam path, and outside the envelope of the beam at injection. Also, these targeting motors 15 must move their targets rapidly in a plane 27 transversely across the beam 13 normally to the axis 29 of the beam 13 at the full range of normal beam paths and beam diameters. Moreover, since strong magnets must bend and focus the beam path along an endless circular equilibrium axis 29 at very high energies, these targeting motors 15 must function in close, cramped quarters subject to radiation from beam spill or other causes in the vacuum box, and also must operate in high magnetic fields between two spaced-apart main confining magnets, not shown for ease of explanation, located along the beam axis 29 and having spaced magnetic poles forming an aperture for the passage of the beam 13 therethrough.

FIG. 1 illustrates one typical well-known targeting motor 15, as well known in the art. Advantageously, motor 15 comprises, a T-2170 motor, made by the Inland Motor Corporation, Radford, Va., although other suitable motors provide suitable wire flipping in accordance with this invention. In this regard the motor 15, in the embodiment of FIG. 1, advantageously has a peak torque $T_p$ of 60 oz.-in.; a motor constant $K_m$ of 10.5 oz.-in./ watt; an electrical time constant $T_m$ of 13.2 milli-sec.; power input, stalled, at peak torque (25°) $P_p$ of 32 watts; viscous clamping coefficient $F_o$ with a zero impedance source and $F_1$ with an infinite impedance source of 0.81 and 0.04 oz.-in./rad./sec.; motor friction torque $T_f$ of 6 percent; ripple cycles/revolution of 33 cycles/rev. ultimate temperature rise per watt TPR of 6.8 deg. C.; maximum permissable winding temperature of 105 deg. C. rotor moment of inertia $J_m$ of 0.011 02-in./sec.$^2$; max. power rate P of $3.3 \times 10^5$ oz.-in./sec.$^2$; max. theoretical acceleration $a_m$ of 5450 rad./sec.$^2$ no load speed $\omega_{NL}$ of 75 rad./sec.; and motor weight of 13.8 oz.

Advantageously, the frameless DC motor 15 has a permanent magnet, a rotor 33 and brush ring and advantageously forms a spring loaded button for assembling and dissembling a suitable target means on the rotor 33 either manually or remotely. Also, suitable stops 43 and 44 advantageously control the rotation of the rotor 33 between limits corresponding to an arc of rotation of about 60° and a suitable target position transducer signals the location of the rotor, for example, for indication in the accelerator control room.

Advantageously, capacitor plates, like the tuner in a radio but having a loaded spring, receives a 1 kilocycle input signal from a suitable source 51, which controls the movements of the rotor 33 by providing in a cycle a suitable forward polarity rotation pulse, a suitable braking reverse polarity signal, and a forward polarity signal, for holding the rotor against the reverse stop 44 to complete one cycle for the beginning of the next cycle, as illustrated in FIG. 2.

To this end, the source 51, advantageously has a suitable forward switch means 53 having forward polarity pulse and holding positions A and B and an off position C, reverse switch means 55 having reverse polarity pulse and holding positions D and E, and an off position F, means 56 for actuating the switches at the desired time in the proper sequence, and a means 59, such as a variable resistance for changing the power level of the signals and pulses transmitted to motor 15 by switch 53 and 55. In actual practice, the switching means 53 and 55, comprise suitable transistors, RC networks and other standard electrical and electronic circuit elements, such as used in connection with standard target motor power supplies at the Brookhaven National Laboratory Alternating Gradient Synchrotron (e.g. as shown in BNL reference drawing number D11-E117-4, dated 3/2/67 by M. Dobert), or as known in the art, but for ease of explanation, the switch means are simply illustrated as electromechanical elements.

In accordance with this invention, a new and novel beam spill apparatus 61 utilizes these standard elements, comprising motor 15, source 51, and suitable circuit and switching means 53 and 55 as described above, for actuating the motor 15 according to the illustration of FIG. 2, suitably to rotate an eccentric means 63 for rotating a beryllium wire 65 in a plane 27 transversely across the beam 13 normally to the axis 29 thereof. Thereupon, a small portion of the beam 13 interacts with the wire 65 to spill (or radiate) high energy particles and electromagnetic radiation out of the beam envelope 73 for detection by suitable known radiation detection probe means. To this end, the beam density profile is obtained as a function of time i.e. the spill monitor, or radiation detector output is proportional at any instant of time to the total wire material volume immersed in the beam. The known velocity and position of this wire therefore determine beam density.

Figure 3:
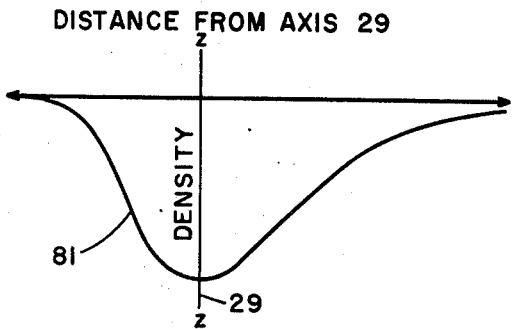
FIG. 3 represents a graphic illustration of a beam density profile produced by flipping a single wire transversely through a high energy, high density, positively charged particle beam to produce a beam spill detected by apparatus having a scintillation detection means downstream from the plane of the flipping wire movement.
Figure 4:
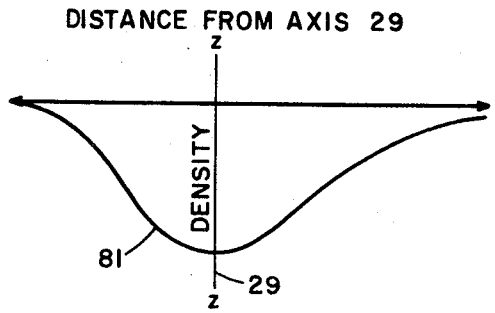
FIG. 4 represents a graphic illustration of a beam density profile produced by flipping another wire transversely through the high energy, high intensity beam, whose profile

In understanding how this invention suitably sweeps the wire 65 through the beam 13, FIGS. 3 and 4 represent beam density profiles 81 obtained by sweeping a 20 mil diameter wire 65 at 3.8 meters/sec. transversely through a proton beam in the above-referenced BNL AGS. The two figures differ in that FIG. 4 illustrates the density profiles obtained when flipping a second wire 65 transversely through beam 13 under the same conditions but at a time interval 20 microseconds after the flipping of a first wire 65 through the same beam 13. This shows the effect of one of the wires, therefore, as dissipating about 10 percent of the beam 13 and broadening the diameter of beam 13 by about 1 millimeter. However, since this might cause objectionable problems in the downstream beam extraction processes, this invention decreases the beam dissipation by obtaining sufficiently high wire velocities between about 6—10 meters/second thereby reducing beam loss to a few percent, e.g., depending on wire diameter and speed, to beam losses of less than 1 percent. Moreover, this invention provides a compact, simple, efficient and practical mechanical means that sweeps the wire 65 through the high energy, high intensity beams 13 without undue or destructive wire heating. Additionally, the apparatus 61 of this invention suitably starts and stops the wire motion at the proper time, and sweeps the wire through the angle of 60° to produce a negligible amount of radiation due to beam halo effects. Also, the apparatus of this invention rotates the wire 65 around a point distant enough from the beam through a path of almost pure translation. To this end, the apparatus 61 of this invention provides a center 91 of rotation for wire 65 at a distance greater than the diameter of the average limit of the aperture of the beam envelope 73 to provide the profile 81 along and transverse to the axis 29 of the beam 13. The latter involves a serious restraint, since the proton beam 13 at injection contains particles of low energy having a relatively large beam diameter 21, as mentioned above.

A further difficulty overcome by the apparatus 61 of this invention, involves a consideration of vertical beam density profiles, which require a center of rotation for wire 65 at the horizontal beam median plane, which passes through the equilibrium axis 29 of beam 13. This problem, which this invention overcomes, presents a particular problem with the above-referenced BNL AGS, due to the limits set on the center of rotation of wire 65 by this accelerator, e.g. by the fact that the air locks thereof allow only the introduction objects below the median plane.

Referring now more particularly to FIG. 1, the center 91 of rotation of the wire 65 has a location vertically below the beam 13 for generating horizontal density profiles. To this end, the wire 65 attaches to a relatively heavy weight 163 suspended for rotation on an eccentric crank 205, whose center of rotation corresponds to the center of rotation of wire 65. When powered by the described current pulse from source 51, the motor 15 drives the crank 205 with the weight 163 at its top from the "down" towards the "up" position. Just before reaching the "up" position the crank 205 acquires its peak angular velocity, which lies between about 10 and 50 m/rad. seconds depending on the moment of inertia of the total target mechanism 61.

Upon reaching the "up" position, the center of gravity of the weight 163 tends to continue to move the weight with a high tangential velocity due to the kinetic energy stored in the weight 163. Shortly thereafter, the center of rotation of the weight 163, which links to the crank 205, comes to rest. This results in a high angular motion of the eccentrically mounted weight 163 around its center of rotation.

Making the eccentricity small and the ratio $r/\epsilon$ high, causes a high angular velocity of motion expressed by the equation $\omega = \omega_o \ r/\epsilon$, where $\omega$ equals the high angular velocity, $\omega_o$ equals the angular velocity of the wire holder just prior to arrival at the "up" position, $r$ equals the distance from the motor axis to the center of rotation, and $\epsilon$ equals the eccentricity. Typical values, of an operable embodiment, comprise: $r=2$ inches and $\epsilon=0.2$ inches to give $\omega/\omega_o = r/\epsilon = 10$.

Advantageously, the motor bearings 37 support the weight 163 to make full use of this gain in angular velocity. Thus, the amount of inertia of the weight 163 causes little problem while the weight acts practically as a point mass since the bearings decrease the spending of kinetic energy in rotating the weight 163. Also, advantageously the flipping wire 65 accelerates during the short time period in which the rotor 33 brakes. From them on, the wire 65 rotates at a constant speed until the weight reaches stop 213. Advantageously, this occurs after completion of a wire rotation of 180°, whereupon the velocity $V$ of the wire equals $\omega r_b = \omega r r_b/\epsilon$, where $V$ corresponds to the center of the beam 13, and $r_b$ corresponds to the velocity of the wire at the distance between the center of rotation of the wire 65 and the center of the beam 13, e.g. on axis 29.

The stop 213 that brakes the rotation of the apparatus 61 of this invention, operates as follows. The stop 213 permits pulse current control from source 51 to control bounding of wire 65. However, the resting position of the wire 65 beyond the position of the beam 13 permits tolerable bouncing. Light springs along with the effect of gravity can limit the braking shock, although actual performance indicates satisfactory operation without the springs, mainly because this invention herein provides a sufficiently high velocity gain even when employing relatively low motor velocities.

In order to generate beam density profiles, as described in more detail hereinafter in connection with FIG. 8, e.g., in one or in more than one plane, the apparatus 61 of this invention employs two or more beryllium wires 65. In one actual apparatus 61, for example, one eccentric crank 205 actuates two wires 65 through a lightweight connecting rod. To this end, the two wires 65 link together through another rod that keeps them always at right angles to each other. Thus, the corresponding centers of rotation locate so that one wire 65 centers vertically below the beam and the other locates in the median horizontal plane.

To remotely monitor the flipping wire 65 of this invention in an actual vacuum enclosure for an accelerator, high speed photographic analysis records the operation of the wire 65 of this invention. Likewise, a photosensitive element placed at one side and close to the plane of movement of the flipping wire 65, and a source of light placed on the other side of the flipping wire 65, monitors the operation of wire 65. Alternately, however, a thin metal foil at the end of travel of the free end or tip of wire 65, operates simply to close a simple electric circuit from a suitable source within the skill of the art, to produce a pulse that an oscilloscope screen records at the end of each sweep of the flipping wire 11, while this screen also simultaneously records the angular position of motor 15 from a standard TPT output. FIG. 5, illustrates an example of these latter oscilloscope traces, wherein the parameters, comprise: $r=2.9$ inches, $\epsilon=0.25$ inches, the total motor angle of rotation $\alpha=56°$ and the total eccentric weight angle of sweep $\beta \approx 180°$. FIG. 5 corresponds to a time scale of 20 ms./division and where five vertical divisions correspond to $\alpha=56°$. The velocity, therefore, gives $\omega_o = \pi \alpha/$ (180×4.7×0.02) $=10.4$ rad./second. Also from FIG. 5, the total sweep time of wire 65 corresponds to a time of about 30 microseconds. The angular velocity of the eccentric weight 163, therefore, gives $\omega = \beta/0.03 = \pi \times 180/$ ( 180×0.03) $=105$ rad./second; and also, the ratios $\omega/\omega_o = 105/10.4 = 10.1$ and $r/\epsilon = 2.9/0.25 = 11.6$, which confirms Eq. (1) and the high mechanical efficiency of the system of this invention.

Numerous tests of 10—20 mil diameter, flipping, beryllium wires 65 in the above-mentioned Brookhaven National Laboratory AGS accelerator, showed that 20 mil diameter wires 65 have a long operating lifetime in circulating beams of up to $1 \times 10^{12}$ protons/pulse. More intense beams, however, cause the wire 65 to heat up, bend or melt, with higher beam energy also causing these effects to become more pronounced.

The advantage of thinner wires 65 e.g. of 10 mil diameter, which this invention provides, resides in the fact that the volume of beryllium metal exposed to the beam decreases as the square of the diameter of the wire 65, while the cooling surface of the wire 65 decreases only linearly with the diameter of the wire 65. FIG. 6, illustrates an oscilloscope display of a circulating proton beam when employing a 10 mil diameter wire 65 flipping at a certain beam energy, i.e. at a time of 560 milliseconds and a velocity of 6.1 meters/second, wherein only small losses in the circulation beam occur.

The beam density profiles generated by the method of this invention do not represent point densities but rather their weighted integrations for the different velocities along the geometry, i.e. length, of the wire 65. Thus, subsequent data reduction, can provide for these geometric effects, when appropriate. Normally, however, this invention handles the broad features of the beam profile required for most applications, such as beam profile stability measurements and variations in beam profile parameter measurements for beam extraction at high densities, without such weighting factors or procedures. In such cases, this invention advantageously employs two linked wires 65 with centers of rotation in the vertical and median horizontal planes to generate vertical and horizontal profiles in rapid succession. Also, the latter provides two successive profiles of the same beam normalized on the time axis.

In this regard, the distance between the two peaks of the oscilloscope display from the two wires 65, corresponds to a geometric factor dependent only on the linkage between the two wire holders for the two wires 65. Thus, this distance between peaks on the oscilloscope display provides for suitable calibration and conversion of the time axis to units of length, as illustrated by FIG. 7, where the time scale corresponds to 2 ms./division, with the first profile to the left corresponding to the vertical profile.

The first wire 65 reduces the amount of the circulating beam slightly so that the second profile is slightly smaller. However, a geometric factor also explains this difference. Thus, for determining the absolute difference between the two profiles, one can compare the oscilloscope displays at different, slightly shifted positions of the apparatus of this invention relative to the axis of the circulating beam.

In actual practice, the double peaked beam profiles, such as illustrated in FIG. 7, repeated themselves closely, with most of the displays falling close to each other in their relative positions, with stable display shapes, an average interval between the two peaks of 6.9 ms., and a standard deviation of 0.1 r.m.s. Subsequent experience with this apparatus indicates a stability better by at least an order of magnitude.

Referring to FIG. 8, in a practical embodiment for providing eccentrically moveable means for flipping two wires 65 through the beam 13, source 51 energizes motor 15, stops 43 and 44 limit the rotation of rotor 33, and eccentric linkage means 201 connected to a crank 205', like rotor crank 205, and a weight 163', like a weight 163, flips two wires 65 and 65' through the beam 13.

To this end, motor 15 locates in vacuum box 303, which connects the evacuated beam tube 305 between magnets 307 (one of which shows in FIG. 8 for ease of explanation) for confining and/or focusing the beam 13 along a beam equilibrium axis 29 in an accelerator 309. Thus, means 53 and 55 connect source 51 to motor 15 to rotate and brake rotor 33 in the proper sequence, shown in FIG. 2. Crank 205' lifts weight 163' up along spring like track 311, whereon crank 313 connected to weight 163' lifts cranks 315 and 317 eccentrically to rotate holders 319 and 321 in the directions shown by arrows 323 and 325 for moving wires 65 and 65' separately in a sequence transversely through beam 13 to produce a beam spill, one of which shows in FIG. 8 for ease of explanation, such as beam spill 327. Thereupon, a detector 329 monitors the spill. In this regard, scintillation crystal 331 produces a light pulse corresponding to the radiation in spill 327, and also corresponds to the density profile of the main beam 13, light pipe 333 transmits this light pulse to photomultiplier 335, and the latter produces an electrical signal corresponding to the light in the pulse, as well as the radiation in spill 327 and the beam density profile of beam 13, for display and recording by oscilloscope 327'. Given the stationary location of the wire flipping means, the oscilloscope also indicates the location of the beam 13 relative to the known location of the desired beam equilibrium axis 29.

The apparatus and method of this invention provide an effective, efficient, and simple nondestructive beam profile generator for high energy accelerators, wherein a thin beryllium wire moves transversely with high velocity through a beam of positively charged particles with small beam losses. Velocities of at least 6 m./second achieved with this invention, provide substantially little or no beam disturbance and little or no wire wear and/or heating. Moreover, the operation and geometry of the apparatus of this invention sufficiently provides for velocities up to at least 10 m./second. Additionally, in contrast to small pellets thrown rapidly through the beam to achieve spills for downstream detection of point density profiles by suitable probes, such as described above, this invention gives integrated beam profiles sufficient for most applications, involving high densities up to $10^{13}$ particles pulse or more, high charged particles beam energies up to 33 Bev. or more, and profiles for extraction purposes or for measurements of beam density stability and/or beam density variations and most targeting applications.

I claim:

1. Apparatus for measuring the density of a beam of charged particles in a high energy accelerator having means for transporting said charged particles along an equilibrium axis, and means forming an evacuated enclosure for containing said beam of charged particles, comprising means in said enclosure having a longitudinally extending wire, an actuator for rapidly flipping said wire transversely through said beam with a sudden, selective, incremental jerk in said enclosure, whereby said wire interacts with a small, selective portion of said charged particles in said beam in accordance with the density profile of said beam for producing a small, corresponding, beam spill of reaction products that diverges from said beam of charged particles in said enclosure, and means for the detection of said reaction products in said beam spill having a scintillation crystal for effecting the production of light in said scintillation crystal in accordance with the interaction of said crystal with said reaction products produced in said beam spill as a result of the interaction of said wire with said charged particles in said beam as said charged particles are transported along said equilibrium axis, whereby said light produced in said crystal provides a selective measure of the density profile of the charged particles in said beam.

2. The invention of claim 1 in which said actuator flips said wire through said beam at a velocity sufficient to minimize its interaction with the beam of charged particles by cutting only less than 10 percent of the particles from out of said beam of charged particles.

3. The invention of claim 1 in which said actuator flips said wire in a plane transversely through said beam of charged particles at a predetermined angle to said axis and at a controlled velocity, abruptly stops said wire velocity, and reactuates said flipping of said wire through said beam in the reverse direction to complete a cycle.

4. The invention of claim 1 in which said actuator has means, comprising a rotatable motor shaft, and a linkage connected to said shaft and said wire for flipping said wire transversely through said beam at a velocity faster than the angular velocity of said motor shaft.

5. The invention of claim 1 in which said actuator, comprises:

a. a motor having first linkage means for flipping said wire in a plane through a predetermined angle at a rapid velocity, and means for selectively stopping the further movement of said wire after said wire passes through said beam of charged particles;

b. crank means connected to said first linkage means at a point spaced from said motor; and c. second linkage means coupling said crank means to a second wire for flipping said second wire transversely through said beam of charged particles at a correspondingly rapid velocity to said first wire for producing successive beam spills for successive detection thereof along the equilibrium axis of said beam at a point spaced therefrom.